United States Patent [19]
Hoos

[11] Patent Number: 5,351,205
[45] Date of Patent: Sep. 27, 1994

[54] METHOD FOR FILTERING DIGITAL SIGNALS WHICH VARIES THE FILTER LENGTH

[75] Inventor: Gerd Hoos, Erlangen-Kosbach, Fed. Rep. of Germany

[73] Assignee: Siemens Aktiengesellschaft, Munich, Fed. Rep. of Germany

[21] Appl. No.: 116,926

[22] Filed: Sep. 7, 1993

Related U.S. Application Data

[63] Continuation of Ser. No. 763,662, Sep. 18, 1991, abandoned.

[30] Foreign Application Priority Data

Sep. 27, 1990 [EP] European Pat. Off. ........ 90118609.8

[51] Int. Cl.$^5$ .............................................. G06F 15/31
[52] U.S. Cl. ........................ 364/724.01; 318/568.18
[58] Field of Search ........... 364/724.01, 724.1, 725.16, 364/174; 318/615, 572, 573, 568.15, 568.18

[56] References Cited

U.S. PATENT DOCUMENTS

| | | | |
|---|---|---|---|
| 4,706,003 | 11/1987 | Nakashima et al. | 318/615 |
| 4,928,258 | 5/1990 | May | 364/724.01 |
| 5,004,968 | 4/1991 | Mizuno et al. | 318/615 |

*Primary Examiner*—David H. Malzahn
*Attorney, Agent, or Firm*—Kenyon & Kenyon

[57] ABSTRACT

Digital signals V(K), for use in numerical control of machine tools or robots, for example, are smoothed by means of digital filters to avoid sudden load changes on the axes. As a result, different filter lengths (N') can be used during an axial movement to accommodate varying loads on the axis. This is achieved by presetting modified discontinuous signals V'(K), whose value is determined by doubling the signal difference (D), and then dividing it by the altered filter length (N') less one, in the filter when changing the filter length.

28 Claims, 2 Drawing Sheets

METHOD FOR FILTERING DIGITAL SIGNALS WHICH VARIES THE FILTER LENGTH

This is a continuation of application Ser. No. 07/763,662 filed Sep. 18, 1991 now abandoned.

BACKGROUND OF THE INVENTION

The present invention relates generally to methods for filtering digital signals, and more particularly to a method which varies the filter length on a real-time basis.

Sequences of digital signals can be smoothed by means of digital filters. In the open-loop control of machine tools or robots, the discontinuous or digital setpoint velocity values calculated by a numerical control system are smoothed by a digital averaging filter in order to avoid sudden load changes on the driven axes. The quality of the smoothing process depends thereby on the filter length, that is on the number of velocity values that are averaged.

Often, filter lengths need to be adjusted to accommodate varying operating states of a machine-tool or robot axis to be controlled. For example, a robot's movement along a path requires a better smoothing process and consequently a greater filter length than does a point-to-point movement. It is presently possible to alter an active filter length when a numerically controlled machine is at a standstill, using conventional methods. For this purpose, the number of velocity values previously stored in the filter is converted by means of weighting functions into new velocity values, whose number differs from the number of previous velocity values. This means that the curve given by the previous velocity values is compressed or expanded.

However, it is very time-consuming to convert the velocity values and it cannot be done under real-time operating conditions. The present invention is directed to the problem of developing a method that enables the filter length of a digital filter to be changed on a real-time basis.

SUMMARY OF THE INVENTION

The present invention solves this problem by storing a specifiable number of input signals corresponding to the filter length in a filter, then generating an output signal from the filter from the sum of the stored input signals, dividing by the filter length, and calculating the signal difference between the input signals and the output signals in each case. In addition, the method stores the specific signal difference, and stores modified digital signals in the filter when there is a particular, specifiable change in the filter length. These modified digital signals each have the same value and their number corresponds to the modified filter length. The value of the modified digital signals is determined by doubling the signal difference, and then dividing it by the altered filter length less one.

Very little extra computational work is required to calculate the value of the modified discontinuous signals with which the digital filter is preset when the filter length is changed. Therefore, a change in filter length is possible during the operation of a machine tool, a robot or another machine.

When the filter length of the filter is altered, preferably the integer component of the modified digital signals is stored, whereby an additional signal difference depending on the integer component is transmitted to the input of the filter. Thus, the rounding errors that inevitably occur are compensated.

To calculate the additional signal difference, one must divide by the factor two, so that another advantageous specific embodiment is obtained when a base-2 modulo operation is applied to the integer component of the modified digital signals. In that way, one can divide by the factor 2 in a simple shift operation.

According to another advantageous development of the invention, changing from an active filter length to a new filter length is performed gradually. In this manner, one avoids a sudden change between two successive filtered signals which could overload a machine axis that is under control.

Too great a difference between two successive filtered signals can occur, however, even with a slight change in the filter length. According to another advantageous specific embodiment of the present invention, the current filter length is retained, when the difference between the new filter length and the current filter length exceeds a specified value.

If there is an unintentional change in the filter length, it can happen that the difference between two successive output signals from the filter is so great, that a work machine can be subjected to a strong mechanical stress. In this case, according to another advantageous development of the invention, the filter length can nevertheless be changed in such a manner that the difference between two successive output signals from the filter does not exceed a specified value.

DETAILED DESCRIPTION

Figure 1:
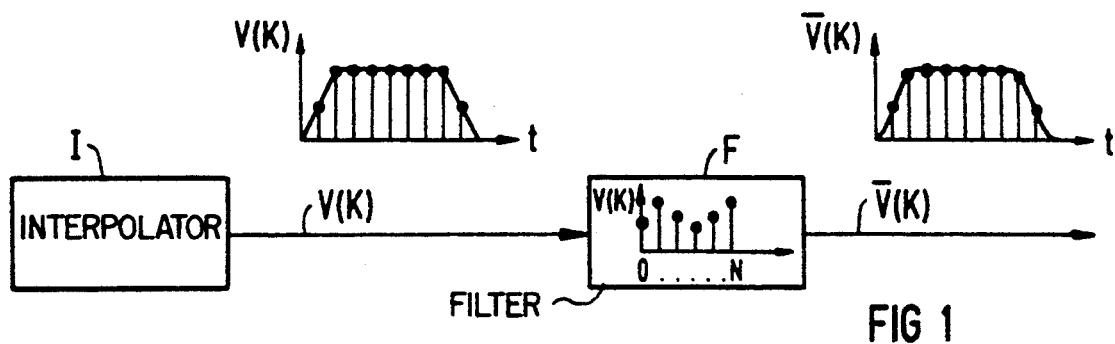
FIG. 1 illustrates a block diagram comprising an interpolator and a digital filter.

FIG. 1 depicts a block diagram of a digital filtering process comprising an interpolator I and a filter F. The interpolator I, which can be a component of a numerical control system (not shown), for example, produces a sequence of digital signals as velocity signals V(K) at its output. These velocity signals V(K) are supposed to control an axis of a numerically controllable machine (likewise not shown), e.g. a robot axis. Since as a rule, numerically controllable axes are provided with incremental encoders, the velocity values V(K) are read out as a number of path increments per time cycle. Therefore, the velocity is not specified in the following in meters per second, but rather in increments (INK). Thus, a particular velocity signal V(K) corresponds to a path specified by the number of increments. This is the path that the numerically controlled axis has to cover during one time cycle of the numerical control system.

The envelope curve of the velocity signals V(K) produced at the output of the interpolator I is irregular. However, in order to travel the robot axis as gently as possible with regard to the mechanical system, a "smooth" velocity profile is desired. For this purpose, the velocity profile V(K) generated by the interpolator I is passed through the digital filter F, which can be an averaging filter. This means that the velocity signals V(K) are transmitted as input signals V(K) to the filter. The filter F has a number of storage locations 0 ... N for storing the velocity values V(K). An output signal $\overline{V}(K)$ from the filter F, that is a filtered velocity value $\overline{V}(K)$ is produced by the filter F. The velocity values V(K) stored in the filter F are added and then divided by the sum of the stored velocity values V(K). This factual situation is described mathematically by EQUATION (1).

$$\overline{V}(K) = \frac{1}{N} \sum_{i=0}^{N-1} V(K - i) \qquad \text{EQUATION (1)}$$

Consequently, the diagram of the filtered velocity signals $\overline{V}(K)$ depicted at the output of the filter F results. Its envelope curve shows a continuous pattern. The quality of the smoothing operation that is achieved by means of the filter F depends thereby on the filter length N, that is on the number of velocity values V(K) which are averaged.

To adapt the quality of the smoothing operation to different industrial instances of numerically controlled axes, the filter length N can be changed during operation, thus during a travel along the axis. However, when a filter length N is switched over to a new filter length N', one must ensure that the path specified by the interpolator I for the axis is travelled exactly. The requisite measures to this end are clarified in greater detail in the following based on FIG. 2.

Figure 2:
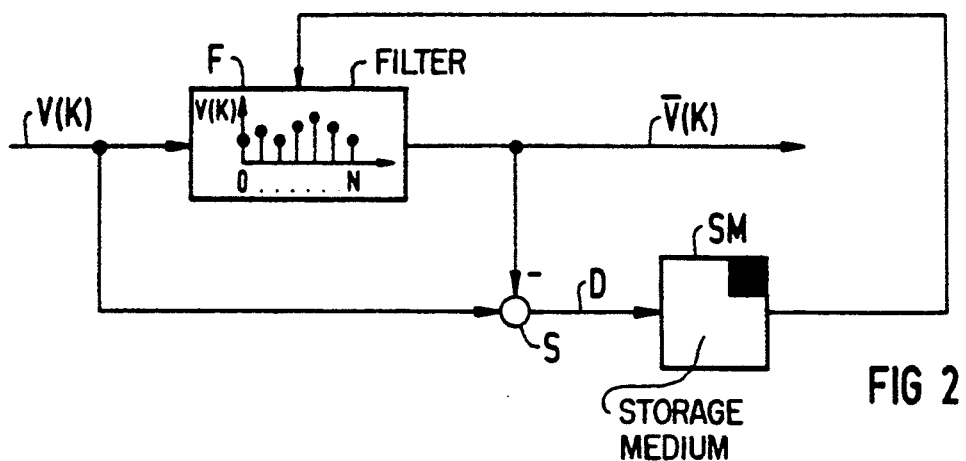
FIG. 2 illustrates a signal flow diagram of a digital-signal filtering process.

FIG. 2 shows the signal flow diagram of a digital-signal filtering process. A sequence V(K) is transmitted to the input of the filter F. For every value V(K), a filtered value $\overline{V}(K)$ is produced according to EQUATION (1) at the output of the filter F. In dependence upon the filtering process (transient processes, etc.), the velocity values V(K) deviate as a rule from the filtered velocity values $\overline{V}(K)$. However, since at the end of the filtering process, therefore after the sequence of velocity values V(K) is run through, a machine axis controlled by the filtered velocity values $\overline{V}(K)$ must have exactly travelled the path which corresponds to the sum of the sequence of the specified velocity values V(K), the signal difference D is determined by means of the summing element S, in this case as a velocity difference D, according to EQUATION (2).

$$D = \sum_{i=0}^{K} V(K) - \overline{V}(K) \qquad \text{EQUATION (2)}$$

Thus, after each filtering or averaging operation, the path of the machine axis that has not been travelled yet is adapted to be tapped off at the output of the summing element S. This path, that is the velocity difference D, is stored after every filtering process in a storage medium SM.

When the filter length N is changed to a new filter length N', one must guarantee that the path specified by the interpolator I (FIG. 1) for the machine axis to be controlled is exactly covered. This means that the modified filter F must be preset with the altered filter length N' (whereby N' can be greater or less than N), so that the path not yet travelled, thus the velocity or signal difference D, does not get lost. To fulfill this condition, the velocity values V'(K), which are modified when the filter length N is switched over, are formulated according to EQUATION 3.

$$V'(K) = \text{mod} - 2\left[ INT\left( \frac{2 \cdot D}{N' - 1} \right) \right] \qquad \text{EQUATION (3)}$$

In principle, the value of the modified velocity signals V'(K) is able to be determined simply by doubling the signal difference, and then dividing it by the filter length N' less 1. For numerical control systems, however, it is particularly advantageous to apply the base-2 modulo operation (MOD_2) and the integer function (INT) to the bracketed term of EQUATION (3). This is because as a result of the integer formation, rounding errors are avoided and, as a result of the base-2 modulo operation, a subsequently required division by the factor 2 can be achieved in a simple shift operation.

The storage locations of the modified filter, whose number now corresponds to the altered filter length N', are preset in each case with the modified velocity value V'(K) calculated with EQUATION (3). However, subject to the integer formation, the path W which is now stored in the filter F and which results from the sum of the velocity values V'(K), still differs from the path difference D. The path W stored in the filter can be calculated according to EQUATION (4).

$$W = \frac{V'(K) \cdot (N' - 1)}{2} \qquad \text{EQUATION (4)}$$

An additional path difference D', which must still be considered in order to travel the machine axis exactly, results from the previous path or velocity difference D and from the path W now stored in the filter. This additional path difference is determined according to EQUATION (5).

$$D' = D - W \qquad \text{EQUATION (5)}$$

Figure 3:
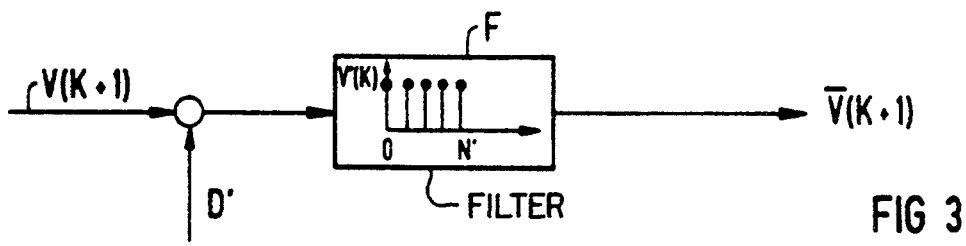
FIGS. 3 and 4 depict a signal flow diagram of a digital filtering process with the signal difference as feedback.

As depicted in FIG. 3, the additional signal difference D' is added to the velocity signal V(K+1) that follows in each case and is transmitted to the input of the filter F.

On the basis of a numerical example, an instance of switching over the filter length is clarified in the following. The filter F is supposed to be changed from a filter length of N=8 to a filter length of N'=4. It is assumed that the sequence of velocity values V(K) generated by the interpolator I (FIG. 1) is constant. Each value of V(K) corresponds to 100 increments per time cycle, therefore V(K)=100 INK.

The path difference D, which is adapted to be tapped off at the summing element S (FIG. 2) or rather which is stored in the storage device SM, is able to be determined according to EQUATION (6) through the analogous application of EQUATION (4).

$$D = \frac{V(K) \cdot (N - 1)}{2} = \frac{100 INK \cdot (8 - 1)}{2} = 350 INK \qquad \text{EQUATION (6)}$$

EQUATION 6 can be only be applied when all V(K)=V(K+1)=V(K+2)=... are identical. Since this is very rarely the case in practice, the path difference D is continually formulated in the storage device SM.

The modified velocity values V'(K) for the altered filter length N' are then calculated according to EQUATION (3) as:

$$V'(K) = MOD - 2\left[INT\left(\frac{2 \cdot 350INK}{(4-1)}\right)\right] = 232INK \quad \text{EQUATION (7)}$$

The four storage locations of the new filter with the altered filter length of N'=4 are now preset with the velocity values V'(K) according to EQUATION (7), that is each with 232 increments. The path W stored in the altered filter is thus able to be determined according to EQUATION (4).

$$W = \frac{V'(K) \cdot (N'-1)}{2} = \frac{232INK \cdot (4-1)}{2} = 348INK \quad \text{EQUATION (8)}$$

The additional path difference according to EQUATION (5) yields then $$D' = D - W = 350INK - 348INK = 2INK \quad \text{EQUATION (9)}$$

Figure 4:
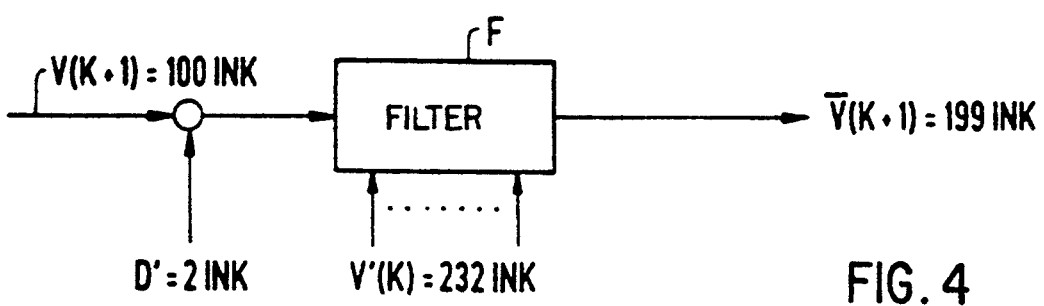
Figure 5:
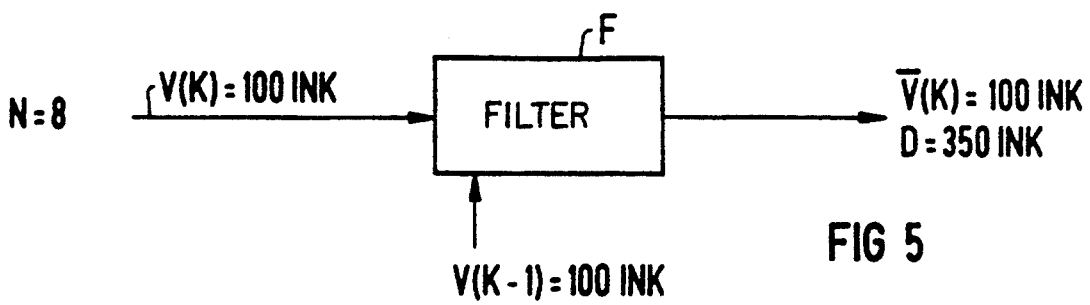
FIGS. 5–9 illustrate signal flow diagrams of the process of successively changing the filter length.
Figure 6:
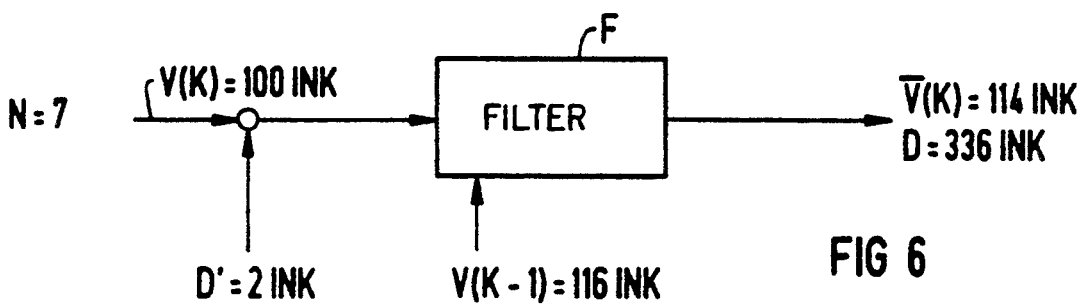
Figure 7:
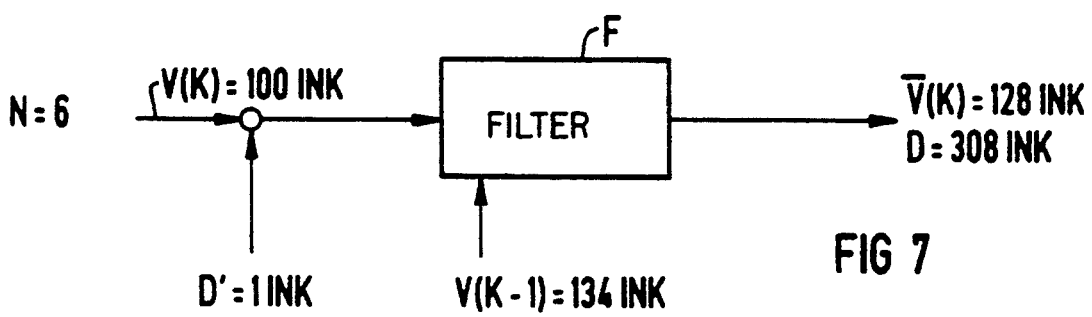
Figure 8:
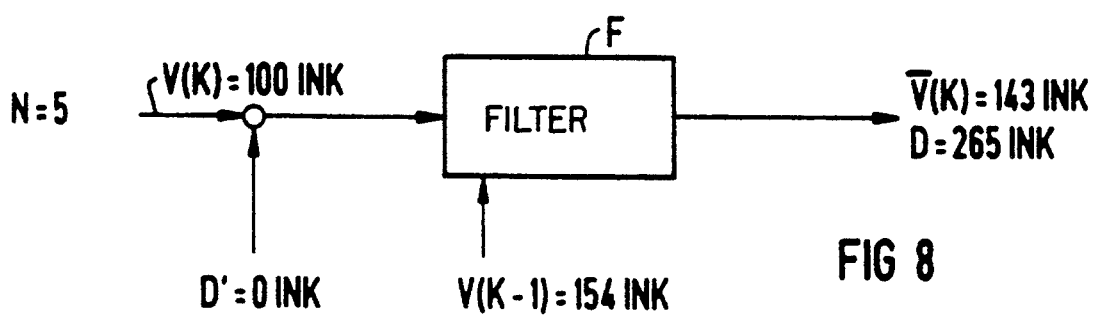
Figure 9:
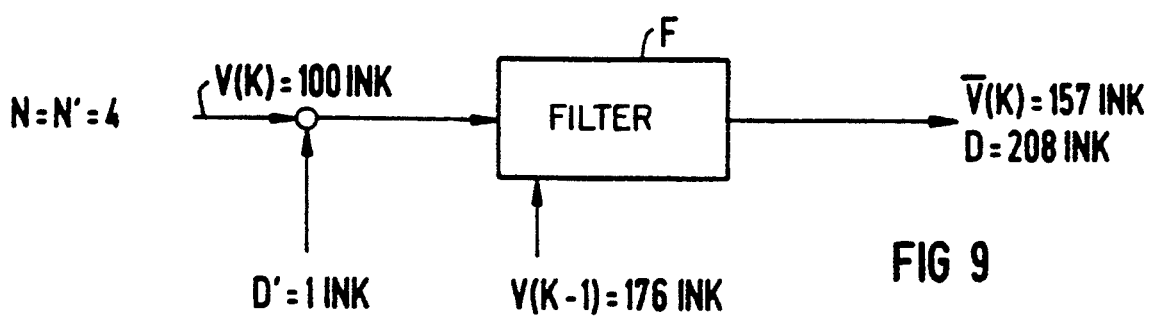

These two remaining increments are added—as clarified based on the description of FIG. 3 and as depicted in FIG. 4—to the subsequent velocity signal V(K+1) and transmitted to the input of filter F.

As depicted in FIG. 4, after the filter length is changed, the first filter value $\overline{V}(K+1)$ results from three modified velocity signals V'(K) with 232 increments in each case, plus with the new velocity value V(K+1) and the additional path difference D' of 2 increments. The filtered integral value $\overline{V}(K+1)$ thus corresponds to 199 increments. It can be calculated according to EQUATION (10).

$$\overline{V}(K+1) = INT\left[\frac{3 \cdot 232INK + 100INK + 2INK}{4}\right] \quad \text{EQUATION (10)}$$
$$= 199INK$$

As is evident from the example, the output value $\overline{V}(K+1)$ of the filter F is increased when the filter length N is shortened, and it is reduced when the filter length N is lengthened, until the filter F again is in the steady-state condition. The difference between $\overline{V}(K)$ and $\overline{V}(K+1)$ is all the greater, the greater the difference is between the preceding filter length N and the altered filter length N'.

To keep a sudden velocity change as small as possible when the filter length N is altered, the change from the old to the new filter length N' can be made gradually. Therefore, for example, to switch from a filter length of N=8 to a filter length of N'=4, the filter length is reduced gradually, that is the filter is switched over from N=8 to N=7, from N=7 to N=6, etc., until the new filter length of N'=4 is reached.

This step-by-step or successive switching over of the filter length N is depicted on the basis of FIGS. 5 through 9. The numerical specifications refer to the example indicated above; the filtered velocity values $\overline{V}(K)$, the signal or path difference D and the additional path difference D' are calculated analogously to the example indicated above. One can see that the specific filtered velocity value $\overline{V}(K)$ only rises slightly by the factor "one" after each reduction in the filter length. Of course, a gradual switching over of the filter length N could also take place in steps, which amount to a multiple of one.

The difference between the filtered velocity signals $\overline{V}(K)$ can additionally be monitored in the case of a particular switching of a filter. This enables an intolerable sudden change in the velocity values $\overline{V}(K)$ to be recognized when the switching of the filter length N is anticipated, so that the switching of the filter length is stopped. This option can be provided both in the case of a successive switching of the filter length N, as well as in the case of a direct switching from a given filter length N to a new filter length N'.

What is claimed is:

1. A numerical control method for controlling a velocity of a numerically controlled machine, comprising the steps of:
    a) producing velocity signals as digital inputs signals (V(K)) of a filter using an interpolator;
    b) storing a number of the digital input signals (V(K)) corresponding to a specifiable filter length (N) in the filter;
    c) generating an output signal ($\overline{V}(K)$) of the filter from a sum of a number of the input signals (V(K)), divided by the filter length (N);
    d) calculating a signal difference (D) between each digital input signal (V(K)) and its corresponding output signal ($\overline{V}(K)$);
    e) storing the signal difference (D) in a storage medium;
    f) modifying the filter length (N) to a modified filter length (N');
    g) determining values of a plurality of modified digital signals V'(K)) when a specifiable change occurs in the filter length to the modified filter length (N') in response to the modifying step f) by doubling the signal difference (D) stored in the storage medium, and then dividing the result by the modified filter length (N') less one;
    h) storing a number, corresponding to the modified filter length (N'), of said plurality of modified digital signals (V'(K)) in the filter; and
    i) providing the numerically controlled machine with the output signals ($\overline{V}(K)$) to control the velocity of the numerically controlled machine;
    j) controlling the velocity of the numerically controlled machine using the output signals $\overline{V}(K)$.

2. The method according to claim 1, further comprising steps of:
    k) forming and storing an integer component of the plurality of modified digital signals (V'(K)) each time the filter length (N) of the filter is modified in the modifying step f);
    l) determining an additional signal difference resulting from using the integer component of the modified digital signals (V'(K)); and
    m) transmitting the additional signal difference to an input of the filter.

3. The method according to claim 2, further comprising the step of performing a base-2 modulo operation on the integer component of the modified digital signals (V'(K)).

4. The method according to claim 3, wherein said modifying step f) comprises gradually changing the filter length (N) to the modified filter length (N').

5. The method according to claim 4, further comprising the step of retaining the filter length (N) when as a result of the modified filter length (N') the difference between two successive output signals (V(K)) exceeds a specified value.

6. The method according to claim 4, wherein said modifying step f) further comprises changing the filter length (N) to the modified filter length (N') in such a way that the difference between two successive output signals (V(K)) does not exceed a specified value.

7. The method according to claim 3, further comprising the step of retaining the filter length (N) when as a result of the modified filter length (N') a difference between two successive output signals (V(K)) exceeds a specified value.

8. The method according to claim 3, wherein said modifying step f) comprises changing the filter length (N) to the modified filter length (N') in such a way that the difference between two successive output signals (V(K)) does not exceed a specified value.

9. The method according to claim 1, wherein said modifying step f) comprises gradually changing the filter length (N) to the modified filter length (N').

10. The method according to claim 9, further comprising the step of retaining the filter length (N) when as a result of the modified filter length (N') the difference between two successive output signals (V(K)) exceeds a specified value.

11. The method according to claim 9, wherein said modifying step f) further comprises changing the filter length (N) to the modified filter length (N') in such a way that the difference between two successive output signals (V(K)) does not exceed a specified value.

12. The method according to claim 2, wherein said modifying step f) comprises gradually changing the filter length (N) to the modified filter length (N').

13. The method according to claim 12, further comprising the step of retaining the filter length (N) when as a result of the modified filter length (N') the difference between two successive output signals (V(K)) exceeds a specified value.

14. The method according to claim 12, wherein said modifying step f) further comprises changing the filter length (N) to the modified filter length (N') in such a way that the difference between two successive output signals (V(K)) does not exceed a specified value.

15. The method according to claim 2, further comprising the step of retaining the filter length (N) when as a result of the modified filter length (N') the difference between two successive output signals (V(K)) exceeds a specified value.

16. The method according to claim 15, wherein said modifying step f) comprises changing the filter length (N) to the modified filter length (N') in such a way that the difference between two successive output signals (V(K)) does not exceed a specified value.

17. The method according to claim 2, wherein said modifying step f) comprises changing the filter length (N) to the modified filter length (N') in such a way that the difference between two successive output signals (V(K)) does not exceed a specified value.

18. The method according to claim 1, further comprising the step of retaining the filter length (N) when as a result of the modified filter length (N') the difference between two successive output signals (V(K)) exceeds a specified value.

19. The method according to claim 7, wherein said modifying step f) comprises changing the filter length (N) to the modified filter length (N') in such a way that the difference between two successive output signals (V(K)) does not exceed a specified value.

20. The method according to claim 1, wherein said modifying step f) comprises changing the filter length (N) to the modified filter length (N') in such a way that the difference between two successive output signals (V(K)) does not exceed a specified value.

21. The method according to claim 1, wherein the numerically controlled machine is a machine tool.

22. The method according to claim 1, wherein the numerically controlled machine is a robot.

23. A numerical control system for controlling a velocity of a numerically controlled machine, comprising:
an interpolator producing digital velocity signals (V(K));
a filter receiving the digital velocity signals (V(K)) produced by the interpolator as digital input signals (V(K)) of the filter, said filter including a means for storing a number of the digital input signals (V(K)) corresponding to a specifiable filter length (N), said filter generating an output signal ($\overline{V}$(K)) from a sum of a number of the input signals (V(K)), divided by the filter length (N), said filter modifying the filter length (N) to a modified filter length (N');
means for calculating a signal difference (D) between each digital input signal (V(K)) and its corresponding output signal ($\overline{V}$(K));
a storage medium storing the calculated signal difference (D); and
means for determining values of a plurality of modified digital signals (V'(K)) when a specifiable change occurs in the filter length to the modified filter length (N') in response to the modifying of the filter length (N) by doubling the signal difference (D) stored in the storage medium, and then dividing the result by the modified filter length (N') less one;
wherein a number corresponding to the modified filter length (N') of said plurality of modified digital signals V'(K)) is stored in the filter; and
wherein the output signals ($\overline{V}$(K)) are provided to the numerically controlled machine to control the velocity of the numerically controlled machine.

24. The numerical control system according to claim 23, further comprising:
means for forming and storing an integer component of the plurality of modified digital signals (V'(K)) each time the filter length (N) of the filter is modified; and
means for determining an additional signal difference resulting from using the integer component of the modified digital signals (V'(K));
wherein the additional signal difference is transmitted to an input of the filter.

25. The numerical control system according to claim 23, wherein said modifying of the filter length (N) comprises gradually changing the filter length (N) to the modified filter length (N').

26. The numerical control system according to claim 23, wherein said modifying of the filter length (N) comprises changing the filter length (N) to the modified filter length (N') in such a way that the difference between two successive output signals (V(K)) does not exceed a specified value.

27. The numerical control system according to claim 23, wherein the numerically controlled machine is a machine tool.

28. The numerical control system according to claim 23, wherein the numerically controlled machine is a robot.

* * * * *